April 20, 1965 P. FORTESCUE ETAL 3,179,569
LOADING-UNLOADING SYSTEM FOR A NUCLEAR REACTOR
Filed Dec. 14, 1960 6 Sheets-Sheet 1

Inventors
PETER FORTESCUE
MITCHELL E. TIMIN
By Soans, Anderson, Luedeka & Fitch
Attys

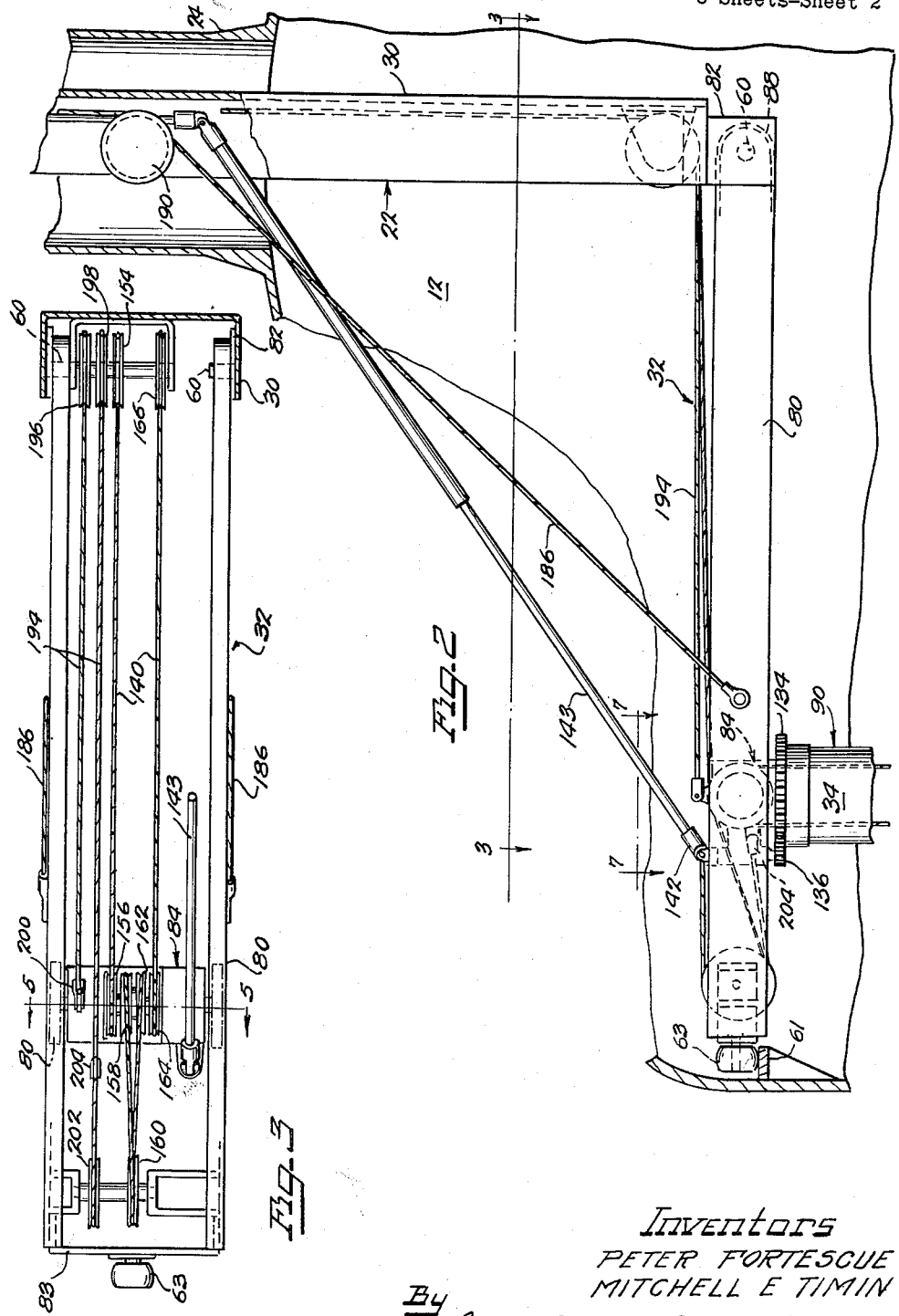

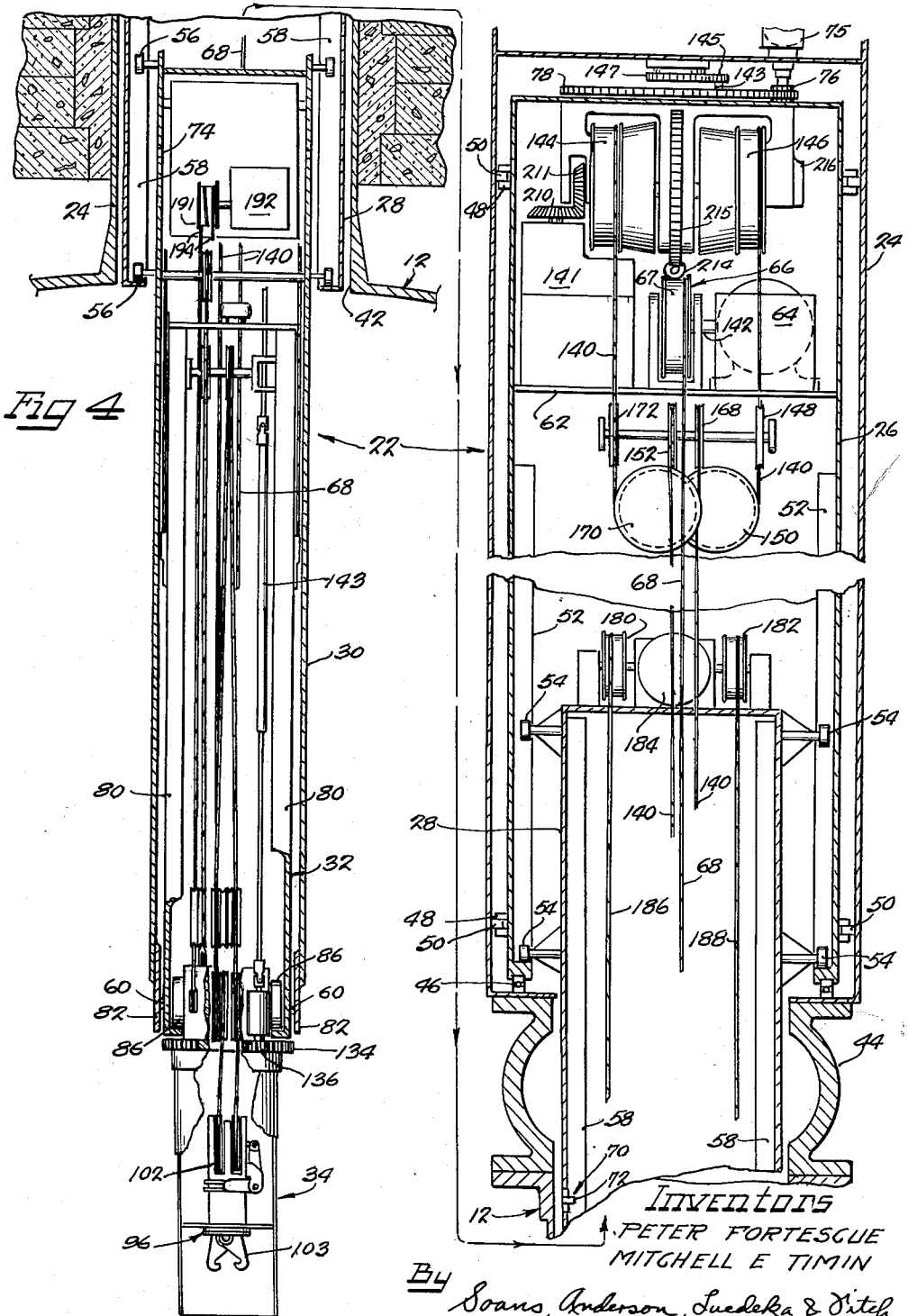

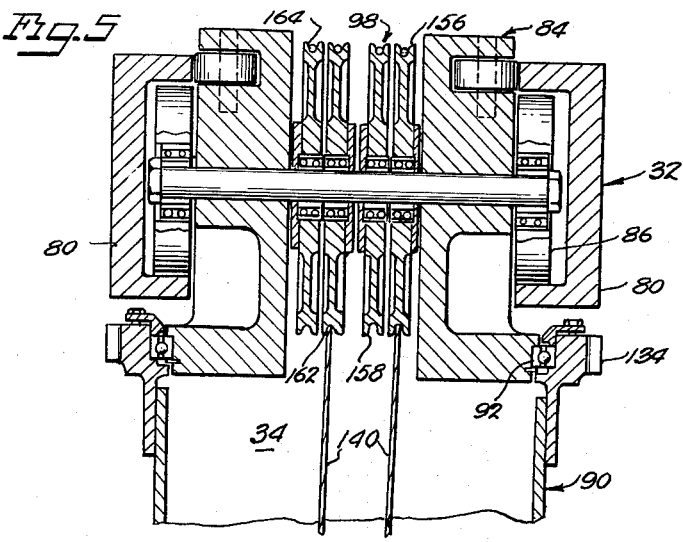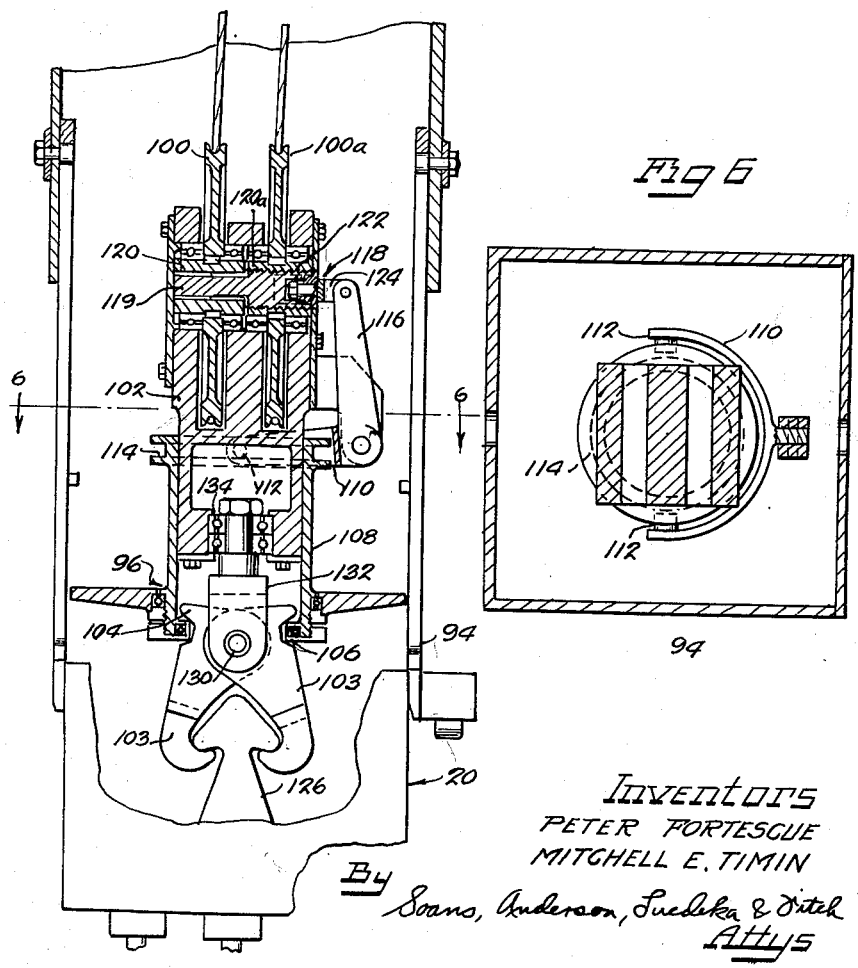

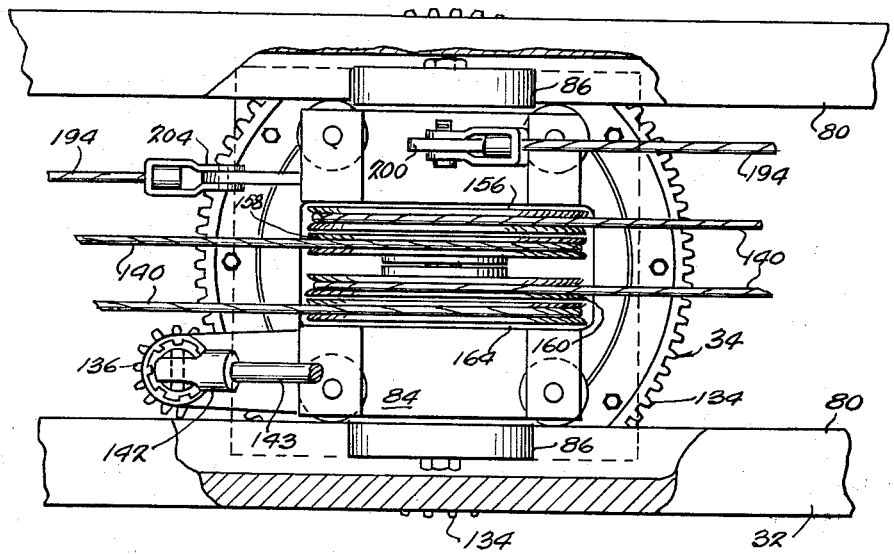
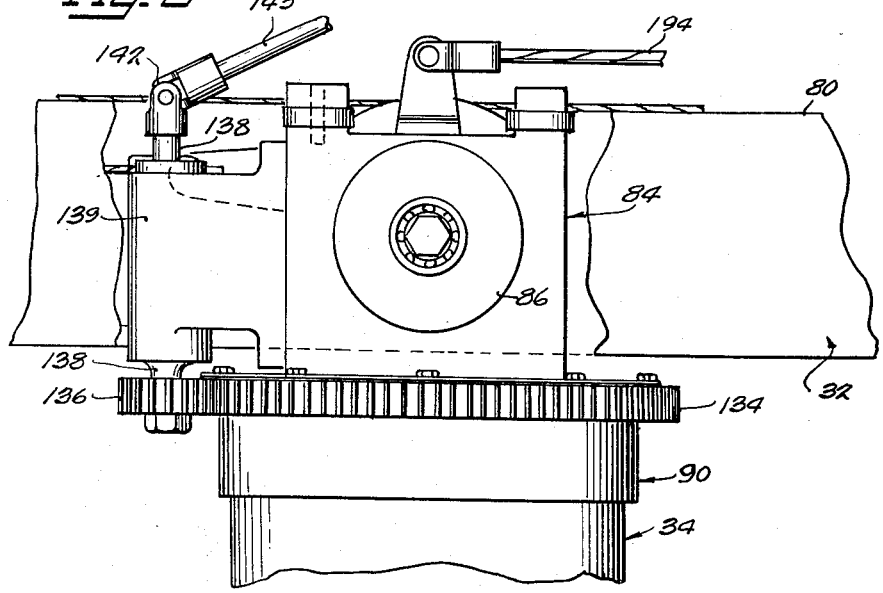
Inventors
PETER FORTESCUE
MITCHELL E TIMIN

April 20, 1965     P. FORTESCUE ETAL     3,179,569
LOADING-UNLOADING SYSTEM FOR A NUCLEAR REACTOR
Filed Dec. 14, 1960     6 Sheets-Sheet 6
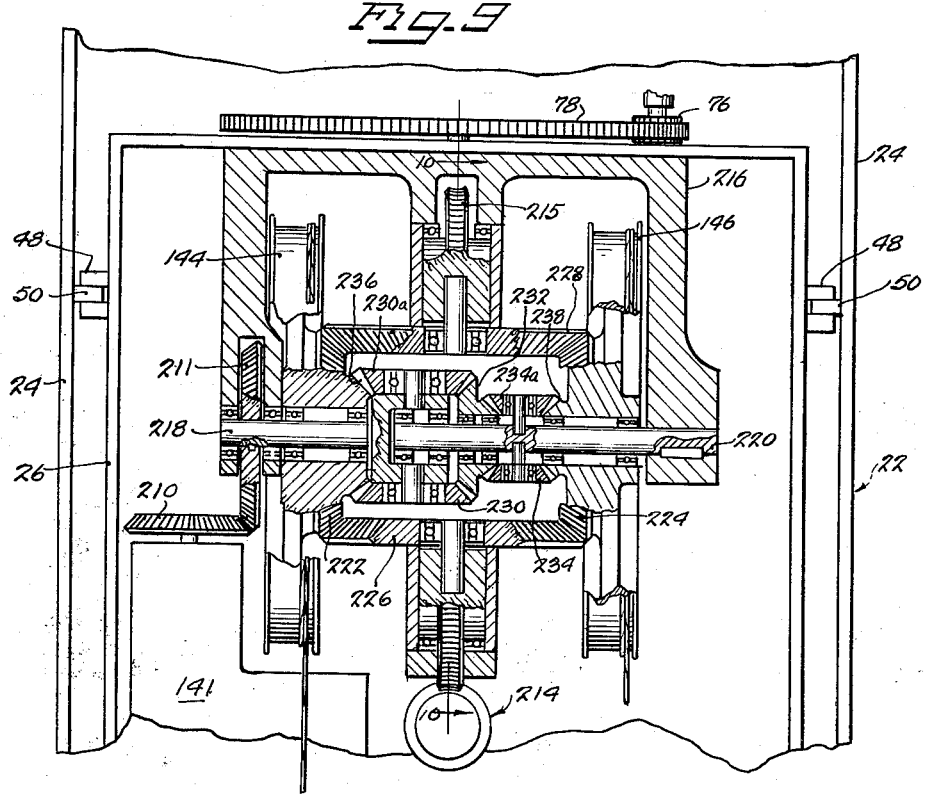
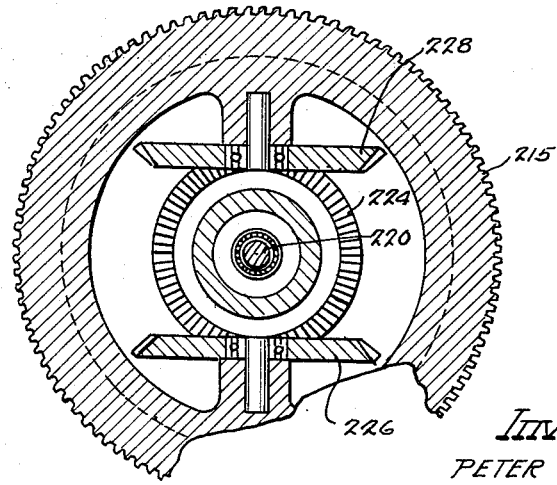
Inventors
PETER FORTESCUE
MITCHELL E. TIMIN United States Patent Office 3,179,569
Patented Apr. 20, 1965

3,179,569
LOADING-UNLOADING SYSTEM FOR A
NUCLEAR REACTOR
Peter Fortescue, Rancho Santa Fe, and Mitchell E. Timin,
San Diego, Calif., assignors to General Dynamics Corporation, New York, N.Y., a corporation of Delaware
Filed Dec. 14, 1960, Ser. No. 75,766
4 Claims. (Cl. 176—30)

The present invention relates to nuclear reactors, and is more particularly directed to means for loading and unloading fuel elements in the reactor.

In a nuclear reactor, it is almost essential that the fuel elements in the reactor vessel be handled in a precise manner from a position outside the pressure vessel. The present invention is particularly concerned with apparatus which is adapted to load and unload fuel elements in the reactor core in a manner affording precision movement of the elements. It is also an object of this invention to provide fuel element handling apparatus which is adapted to selectively raise or lower one or more fuel elements relative to the normal operating position within the reactor core and to transfer such elements to a position of storage within the reactor vessel. Still another object is to provide apparatus of the type described, which is so constructed as to be easily inserted into the reactor vessel and withdrawn therefrom. Other objects and advantages will become apparent from the following description of the selected embodiment, which is illustrated in the accompanying drawings, wherein:

FIGURE 2 is an enlarged fragmentary side elevational view of the structure in FIGURE 1;

FIGURE 3 is a plan view partly in section taken along the line 3—3 in FIGURE 2;

FIGURE 4 is an enlarged side elevational view of the fuel handling apparatus, partly in section, showing the apparatus in its folded condition for withdrawal from the reactor vessel;

FIGURE 5 is an enlarged sectional view taken along the line indicated at 5—5 in FIGURE 1 and FIGURE 3;

FIGURE 6 is a cross-sectional view taken along the line 6—6 in FIGURE 5;

FIGURE 7 is a fragmentary plan view taken generally along the line 7—7 in FIGURE 2, with parts broken away and in section;

FIGURE 8 is a side elevational view of the structure in FIGURE 7;

FIGURE 9 is an enlarged cross-sectional view of the drive pulleys seen in the upper portion of FIGURE 4; and FIGURE 10 is a sectional view taken along the line 10—10 in FIGURE 9.

Figure 1:
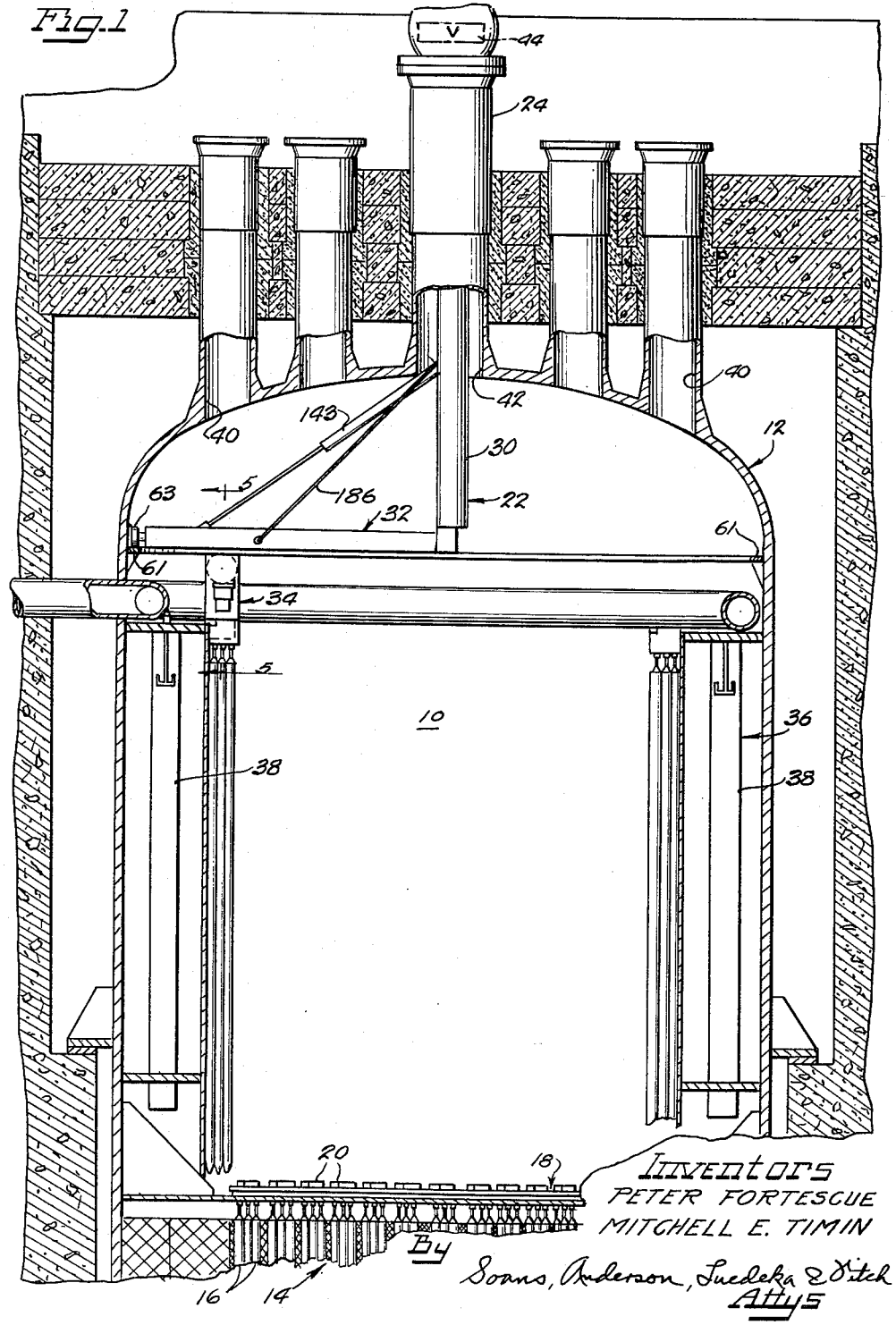
FIGURE 1 is a cross-sectional view of the upper portion of the reactor vessel, showing the fuel handling apparatus in its operating position.

With reference first to FIGURE 1, it will be noted that the present invention is embodied in a nuclear reactor 10 of the gas-cooled type, wherein pressurized gas, such as helium, is introduced into a pressure vessel 12 in a relatively cool state and is circulated through the reactor core, indicated generally at 14 and disposed in the lower portion of the vessel 12, to absorb heat therefrom and then the hot gases are conducted to a steam generator, or the like, where they are utilized in the production of steam power. The fuel elements 16 within the core 14 are arranged in groups or clusters, which are supported in part by a top grid plate 18 through means including a box-like support 20 for each cluster which rests on the grid plate. After a period of operation, the fuel elements become less reactive due to burnup of the fissionable material therein and, therefore, must be replaced. In order to effectively and efficiently handle the fuel elements during the loading and unloading operations, there is provided a fuel handling apparatus 22 which is adapted to be operably positioned in the upper part of the pressure vessel 12, but which is otherwise located in a housing 24 above the pressure vessel that is adapted to be sealed off from the vessel.

Generally, the fuel handling apparatus 22 comprises a series of three telescoping housing sections 26, 28 and 30 (FIGURE 4), which are movable axially of the pressure vessel, and the lowermost section 30 has hingedly connected thereto a grappler supporting arm structure 32 carrying a relatively movable grappler means 34. Power driven mechanism, which is associated with the fuel handling apparatus, is effective to provide relative axial movement of the housing sections and to position the grappler arm 32 in the horizontal position seen in FIGURE 1 with the grappler 34 disposed in downwardly depending relation thereto. The grappler arm 32 is rotatable about the axis of the reactor vessel 12, and the grappler 34 is movable along the grappler arm and can be raised or lowered relative to the arm 32, to thereby position the grappler in engagement with any selected one of the fuel element supporting boxes 20.

After a cluster of fuel elements is withdrawn from the reactor core, it is elevated and moved to a position of support on storage racks 36 provided along the side walls of the pressure vessel 12. These racks are associated with fission trap tanks 38, so that the fission products are trapped while the elements are temporarily stored within the pressure vessel. Subsequently, the spent fuel elements may be removed from the pressure vessel by suitable grappler means or the like which can be extended downwardly through passages 40 located at the upper part of the vessel in alignment with the storage position for the fuel elements.

Looking particularly to FIGURES 2, 3 and 4, it will be noted that the fuel handling apparatus 22 is motivated almost entirely by a series of cable and pulley arrangements, which are driven by suitable motors, or the like, disposed within the telescoping sections. With reference particularly to FIGURE 4, it is seen that the housing 24 is disposed above the pressure vessel 12 and at the center thereof. The pressure vessel includes an upwardly extending axial passageway 42, which is adapted to communicate with the housing 24, and a suitable valve means 44 (FIG. 1) is disposed between the housing 24 and the vessel 12 to shut off the pressure vessel when the fuel handling apparatus is withdrawn into its housing 24. Such valve means may be of any suitable form, for example it can be a valve similar to the valve 52 in U.S. Patent 3,029,842, issued April 17, 1962.

The uppermost section 26 of the telescoping sections of the fuel handling apparatus is longitudinally fixed within the housing 24 but is axially rotatable therein, and such rotation is utilized to move the grappler 34 circumferentially within the vessel when the latter is disposed in operating position within the pressure vessel. More particularly, the generally cylindrical upper section 26 is supported at its lower end on a circular race 46 of ball bearings, and the side wall of the section 26 is also equipped with a pair of circular bearing means 48 which engage bearing supports 50 on the interior of the main housing 24, to thereby stabilize the grappler mechanism 22 during its rotation about the axis of the pressure vessel 12.

Inside of the uppermost section 26, there is provided a pair of inwardly extending, longitudinal guideways or tracks 52, which are engaged by rollers 54 carried by the next telescoping section 28 at its upper end in laterally extending relation thereto. The rollers 54 and guideways 52 cooperate to provide for relative axial movement between the telescoping sections 26 and 28 and also to secure the latter to the former for rotation in unison about the central axis of the reactor vessel 12. Similarly, the third telescoping section 30, which is channel-shaped in cross-section, is provided at its upper end with laterally extending rollers 56 which engage guideways 58 provided in the interior of the section 28 to fix these two sections together for rotation in unison while affording guided relative axial movement therebetween.

The lower end of the telescoping section 30 has hingedly connected thereto, as by means of a pair of pins 60, the inner end of the grappler arm 32, and this arm is so constructed that it is adapted to be swung between a generally horizontal position, shown in FIGURE 2, and its vertical position, shown in FIGURE 4, wherein the grappler arm is received within the channel formed by the telescoping section 30. When in its operating position, the grappler arm 32 is supported at its free end by a ledge 61 (FIGURE 1) extending around the inner wall of the reactor vessel 12. In order to achieve this, there is provided a roller 63 on the outer end of arm 32 in position to engage the ledge 61 and provide a rolling support for the arm on the ledge.

In order to provide for the telescoping of the several sections comprising the fuel handling apparatus 22, and also to provide for the described hinged movement of the grappler arm 32, there is provided a series of cable and pulley arrangements which are contained within the telescoping sections and suitably controlled from a remote position. More particularly, the interior of the upper section 26 is provided with a supporting frame structure 62 for a main drive motor 64 which operates the cable hoist 66 controlling the telescopic movement of the three sections 26, 28 and 30. This hoist includes a drum 67 and a cable 68 extending therefrom to a connection with the upper end of the third or lowermost section 30. The downward movement of the telescoping sections is limited by the engagement of the rollers 54 and 56 with the ends of their respective tracks 52 and 58, and in this respect the several telescoping sections are constructed and arranged so that, when the lower section 30 is in its lower-most position, it is projected into the pressure vessel 12 a distance sufficient to permit vertical swinging movement of the grappler arm 32 relative to its folded position within the section 30 seen in FIGURE 4. Furthermore, in order to provide a constant elevation for the grappler arm 32 during its operation in the reactor vessel, there is provided a secondary stop means for the lower section 30 which maintains the latter at a predetermined position above the described lowermost position. More particularly, the interior of the grappler section 28 is provided with two or more solenoid operated stops 70 which are controlled from the exterior of the housing 24, and which are adapted to have the plunger portion 72 thereof inserted in suitable openings 74 in the sides of the lower section 30 to releasably fix the latter in position.

In order to accurately position the grappler arm 32 circumferentially of the axis of the reactor pressure vessel 12, there is provided a rotary drive means at the upper end of the uppermost grappler section 26. This mechanism includes a suitable motor 75 having its drive shaft extending downwardly and having a spur gear 76 thereon engaging a large ring gear 78 fixed on the upper end of the housing 26. Consequently, operation of the rotary drive motor 75 effects rotation of the section 26, as well as rotation of the interconnected telescoping sections 28 and 30 and the grappler arm 32. This rotary drive is preferably coupled with a suitable indexing mechanism, so that a remote operator can know precisely where the grappler arm 32 is located in the pressure vessel 12 with respect to the reactor core.

The grappler arm 32 comprises generally a pair of elongated, channel-shaped members 80 (FIGURES 2 and 3), which are pivoted at their inner ends on an extension 82 of the lower end of telescoping section 30 through means of the pins 60. The members 80 are disposed in spaced, parallel relation to each other and are joined at their free ends by a transverse member 82 which also supports the roller 63. The lower flanges of the channel members 80 provide a track for a carriage portion 84 of the grappler 34, which includes a pair of rollers or wheels 86 supported on the track. Consequently, the grappler 34 can be moved lengthwise of the grappler supporting arm 32 to selectively position the grappler radially of the reactor core. In this respect, it is to be noted that an arcuate section 88 is disposed at the inner end of each channel 80, to receive the rollers 86 as the arm 32 is swung upwardly into its foldable position (FIGURE 4), and this arrangement permits the grappler 34 to hang vertically in position for withdrawal of the entire fuel handling structure 22 into the housing 24 on top of the reactor vessel.

In addition to the carriage 84, the grappler 34 includes a depending housing portion 90 (FIGURE 5) which is rotatably mounted on the carriage portion by suitable bearings 92, and the lower end 94 of the housing 90 is shaped and adapted to telescopically engage the upper end portion of the fuel element supporting box 20 which in the illustrated instance is rectangular.

Within the grappler housing 90 is a grappler, indicated generally at 96, which is supported by a cable and pulley arrangement including a series of four pulleys 98 on the carriage 84 and a pair of pulleys 100 and 100a on the grappler. The grappler 96 includes a main body portion 102, rotatably mounting the pair of pulleys 100 and 100a, and a pair of pivotally mounted grappler hooks 103. The upper end portion of each hook 103 includes a notched cam portion 104, which is engaged by inwardly projecting flanges 106 carried by a sleeve 108 slidably disposed on the lower end of the main body portion 102. Consequently, it will be noted that vertical movement of the sleeve 108 effects opening and closing of the grappler hooks 103. The vertical movement of sleeve 108 is achieved through means including a bell crank having a bifurcated lower arm 110 having pins 112 fixed thereon in position to engage an annular grooved portion 114 of the sleeve 108. This bell crank is pivoted at its crank portion to the grappler body 102, and the other arm 116 is pivotally connected at its upper end to a control member 118 which extends inwardly of the main body 102 and axially of the pair of pulleys 100 and 100a.

More particularly, the center shaft for the pulleys 100 and 100a (FIGURE 5) is in two sections, and the control member 118 comprises an elongated part 119 disposed axially through bores provided in each of the two separate pulley shaft sections 120 and 120a. The inner part of the elongated part 119 is splined to the shaft section 120 for movement axially thereof, and the outer part is in threaded engagement, as indicated at 122, with the other section 120a of the pulley shaft. A yoke 124 interconnects the elongated part 119 and the bell crank arm 116 in a manner preventing rotation of part 119 but permitting axial movement thereof which is translated into swinging movement of the bell crank. Consequently, rotation of the outer or right hand pulley 100a relative to the left hand pulley 100 will cause the threadedly engaged part 118 to move axially, thereby moving the yoke 124 to provide swinging motion for the bell crank which results in vertical movement of the sleeve 108. Such movement of sleeve 108 causes the hooks 103 to move relative to one another so that such hooks can selectively engage or disengage the center support post 126 on the fuel element box 20. Rotation of the two pulleys together will have no effect on the positioning of the sleeve 108 and, consequently, will not change the position of the hooks 103. It will be noted, also, that the hooks 103 are pivotally mounted, by a pin 130, on a depending yoke 132 rotatably mounted at its upper end in a bearing 134, so that the main grappler body 102 can revolve while the hooks 103 remain stationary. This enables the grappler to maintain a constant directional orientation of the fuel element supporting box 20 as it is being transported and the grappler carriage and arm are being moved radially and/or circumferentially of the reactor vessel.

In order to orient the grappler housing section 94 with respect to the fuel element supporting box 20, there is provided a large gear 134 (FIGURES 7 and 8) at the upper end of the grappler housing 90 which is engaged by a pinion drive gear 136. The pinion 136 is supported on a rotatable shaft 138, which is journalled in a bearing bracket 139 carried by the grappler carriage 84, and the upper end of the shaft 138 is connected, through a universal joint 142, with the lower end of a control shaft 143. The shaft 143 is articulated and formed of telescoping sections (FIGURE 2) having mating splined portions, and the upper end of the control shaft carries a small spur gear 145 which meshes with a large stationary gear 147 at the upper end of the housing 24 (FIGURE 4). These two gears are in the same ratio as the gears 134 and 136 on the grappler. When the entire fuel handling apparatus is rotated, the gear 145 revolves around the stationary gear 147 in planetary fashion causing gear 145 to rotate. This rotation of spur gear 145 is transmitted through shaft 143 to gear 136 on the grappler, thereby driving the large gear 134. Since the two pairs of gears are in the same ratio, the grappler housing 90 rotates at the same speed that the upper telescoping section 26 is being rotated but in the opposite direction. Consequently, the rotation of grappler housing 90 relative to the upper housing 24 is zero.

The various power driven cable and pulley arrangements for effecting the above-described operations of the fuel handling apparatus are carried by the telescoping sections 26, 28 and 30 and the grappler arm 32, and are suitably controlled by mechanism (not shown) from a position remote from the reactor vessel. As indicated previously, the axial movement of the telescoping sections is controlled by the motor 64 which operates the drum 67 on which is wound the cable 68 connected to the lower section 30.

The cable 140 passes downwardly from drum 146 (FIGURE 4) around a series of guide pulleys 148, 150 and 152 within telescoping section 26, and then through the sections 28 and 30 to a guide pulley 154 (FIGURE 3) at the lower end of the latter telescoping section. Cable 140 then extends lengthwise of the grappler arm 32 to a pulley 156 (see also FIGURE 5) on the grappler carriage portion 84, downwardly to the pulley 100a on the grappler body and then back up to the pulley 158 on the carriage. The cable 140 then passes around the upper portion of pulley 158 and forwardly along grappler arm 32, where it is disposed around a guide pulley 160 and then returned to another pulley 162 on the grappler carriage 84. The cable 140 passes over the pulley 162 and downwardly to and around the grappler pulley 100, and then back to the grappler carriage and around a pulley 164. The cable is then returned lengthwise of grappler arm 32 to a guide pulley 166 at the lower end of a telescoping section 30 (FIGURE 3), and then passed upwardly to the upper part of telescoping section 26 (FIGURE 4). In the latter section, cable 140 passes around a series of guide pulleys 168, 170 and 172 and thence to the second grappler operating drum 144.

With reference particularly to FIGURE 9, it will be seen that the means provided for selectively driving the pair of drums 144 and 146 in the same or opposite directions comprises a motor 141 which is connected through suitable gearing, including a bevel drive gear 210, with a bevel gear 211 fixed on one end portion of a split or divide supporting shaft arrangement for the drums 144, 146, and a second motor (not shown) which is connected through a worm drive 214 with a large ring gear 215 intermediate the drums. More particularly, there is fixed to the upper end of housing 26, in depending relation thereto, a bearing bracket 216 affording means for rotatably supporting the ring gear 215 and a drive shaft 218 which rotatably supports the drum 144 and to which bevel gear 211 is fixed. The inner end of shaft 218 is in the form of a cylindrical yoke, which provides a bearing support means for the inner end of a shaft 220 which is coaxially aligned with shaft 218 and fixed to the bracket 216. The other drum 146 is rotatably mounted on the non-rotatable shaft 220.

The inner faces of drums 144 and 146 are provided with a pair of bevel gears 222 and 224, respectively, to thereby provide a driving relation between the large gear 215 and the drums through means of a pair of bevel gears 226 and 228 which are rotatably carried by the gear 215 (FIGURE 10) in coaxially spaced relation. There is also provide a series of idler gears 230, 230a, 232, 234 and 234a for also transmitting movement between 144 and 146. The gears 230 and 230a are rotatably mounted on the yoke portion of the rotatable shaft 218 at diametrically opposite positions, and these gears mesh with a bevel gear 236 on the inner face of drum 144 and with the idler gear 232 rotatably supported on the fixed shaft 220. Gear 232 in turn is disposed in meshing engagement with the gears 234 and 234a which are connected with the bevel gear 238 on the inner face of drum 146.

The operation of motor 141, which is reversible, is effective, through bevel gears 210 and 211, to rotate shaft 218 in a predetermined direction. In such case, the gears 230 and 230a provide a driving connection with drum 144, through bevel gear 236 on the face of the drum, and with drum 146 through gear 232 and gears 234, 234a, to effect rotation of the drums in opposite directions at the same speed. While the drums thus rotate, the gears 226 and 228, of course, rotate in opposite directions and no drive is transmitted to the ring gear 215.

In order to rotate the drums 144 and 146 at the same speed and together, the motor connected with worm 214, which motor is also reversible, is activated, while the motor 141 is inactive. Drive is transmitted through worm 214 to the gear 215 for rotation of the latter in a predetermined direction and at a predetermined speed. As the gear 215 rotates, it drives the drums 144 and 146 in unison and in the same direction through the gears 226 and 228 which mesh with gears 222 and 224 disposed, respectively, on the drums. In such case the gears 230, 230a, 232, 234 and 234a are merely idler gears transmitting no power.

Consequently, it is seen that operation of the drum 144 to let out the cable 140, while drum 146 is operated in the reverse direction through the above described operation of motor 141 to take up cable 140, is effective to rotate grappler pulleys 100 and 100a in opposite directions and thereby cause the hooks 103 to move relative to each other in one direction; whereas operation of drum 146 to let out cable 140, while rotating drum 144 to take up the cable, will cause a reverse rotation of pulleys 100 and 100a in opposite directions and move hooks 103 relative to one another in the opposite direction. Furthermore, drums 144 and 146 can be rotated in the same direction, by supplying power through the worm drive 214 in the manner described above, to provide for raising and lowering of the grappler 34 relative to the supporting arm 32, through extension and contraction of the cable loops between the pulleys 156 etc. on the carriage 84 and the pulleys 100 and 100a on grappler body 96. Since the lengthening and shortening of these loops results in uni-directional rotation of pulleys 100 and 100a there is, of course, no attendant change in the position of hooks 103. The rotation of the drums 144 and 146 in the same direction can also be used to accommodate movement of the grappler 34 along its supporting arm 32 without raising or lowering the grappler hooks 103 relative to arm 32.

In order to effect the folding and unfolding of the grappler arm 32 relative to the lower section 30, there is provided a pair of drums 180 and 182 (FIGURE 4) at the upper end of telescoping section 28. These drums are selectively rotated by means including a drive motor 184 and have wound thereon the end portions of a pair of cables 186 and 188. These cables extend downwardly to pass around a pair of guide pulleys 190 (FIGURE 2) on the lower telescoping section 30, and are connected at their free ends to an outer portion of the grappler arm 32 at opposite sides thereof. Consequently, drums 180 and 182 are rotated together to provide for swinging movement of the grappler arm about its pivot connection 60.

An additional cable and drum arrangement is carried at the upper end of the lowermost telescoping section 30 for effecting traveling movement of the grappler carriage 84 along the grappler arm or boom 34. More particularly, a drum 191 (FIGURE 4) is connected in driven relation to a motor 192 and has wound thereon an intermediate section of a cable 194. The two lengths of the cable 194 extend downwardly and around a pair of guide pulleys 196 and 198 (FIGURE 3) and along the grappler arm. One end of the cable 194 is attached directly to the grappler carriage at 200, and the other end passes around a guide pulley 202 at the outer end of the arm and is brought back to a connection 204 with the forward end of carriage 84. It is seen, therefore, that rotation of the drum 190 in one direction will effect a corresponding movement of the grappler 34 along the arm 32, and reverse rotation of the drum will cause the grappler to move in the opposite direction along the supporting arm.

From the foregoing description, it will be apparent that the described structure provides for precision control of the grappler 34 in the loading and unloading of fuel elements and control rods, relative to their operative position within the reactor core. Also, the fuel handling apparatus 22 incorporates the use of cables with telescoping frame sections to minimize the height required for such apparatus and enable the complete withdrawal of the apparatus from the reactor vessel 12.

In connection with the operation of the described fuel handling apparatus 22, it should be understood that the operations of the various drum and cable arrangements are correlated in a suitable manner to achieve the described mode of operation. For example, as the grappler 34 is moved along the arm 32, through operation of the motor 192 and drum 194, the cable 140 operating the grappler hooks 103 merely unwinds from two of the four pulleys 156, 158, 162 and 164 on the carriage 84 and winds back on the other two, thereby rotating pulleys 100 and 100a in the same direction which has no effect on the grappler hooks 103. Furthermore, prior to the folding of the grappler arm 32 to its position seen in FIGURE 4, the carriage 84 is moved to the extreme inner end of the arm where the carriage wheels 86 engage the arcuate supports 88 for support by the latter as the arm 32 is swung upwardly. Then too, as the telescoping sections are drawn upwardly into the housing 24, the drums 144, 146, 180 and 182 are rotated to take up the slack in the various cables attached to these drums.

Although shown and described with respect to particular apparatus, it will be apparent that various modifications might be made without departing from the principles of the invention disclosed herein.

We claim:

1. In fuel handling apparatus for nuclear reactors having a generally cylindrical, vertically disposed reactor vessel and wherein said apparatus includes a boom adapted to extend radially of the reactor vessel for horizontal swinging movement about the vertical axis of the vessel, a grappler device comprising a carriage portion supported on said boom for movement longitudinally thereof, a plurality of pulleys rotatably supported on said carriage portion, an elongated housing supported on said carriage in depending relation thereto at a position underlying said pulleys, a grappler body within said elongated housing supporting a pair of hook-like elements at its lower portion in a manner affording relative vertical swinging movement thereof, means on said body engaging said hook-like elements and operable to control the relative swinging movement of said elements, a pair of pulleys rotatably mounted on the upper portion of said body through means including a pair of separate, coaxial shafts rotatably supported on said body and fixed, respectively, to said pulleys, said shafts having generally aligned axial passages therethrough, an elongated element disposed in said axial passages with one end of said element non-rotatably and axially slidably secured to the surrounding one of said shafts, the other end of said elongated element threadedly engaging the inner wall of the passage in the other of said shafts, whereby rotation of said pulleys in opposite directions causes axial movement of said elongated element, and a pair of cables disposed about said pair of pulleys on said body and extending upwardly therefrom and about said plurality of pulleys on said carriage, means controlling the movement of said pair of cables to selectively cause said pair of pulleys on said grappler body to rotate in opposite directions and effect axial movement of said elongated element, and means interconnecting said elongated element with said hook controlling means so that said axial movement of said element results in relative swinging movement of said hooks.

2. In fuel handling apparatus for nuclear reactors having a generally cylindrical, vertically disposed reactor vessel and wherein said apparatus includes a boom adapted to extend radially of the reactor vessel for horizontal swinging movement about the vertical axis of the vessel, a grappler device comprising a carriage portion supported on said boom for movement longitudinally thereof, a plurality of pulleys rotatably supported on said carriage portion, an elongated housing supported on said carriage in depending relation thereto at a position underlying said pulleys, said housing being shaped at its lower end for indexing engagement with one or more elements within the reactor core and being connected with said carriage in a manner affording rotation of the housing relative to said carriage, a grappler body within said housing supporting a pair of hooks at its lower portion in a manner affording relative vertical swinging movement thereof, cam means on said body engaging said hooks and movable relative thereto to control the relative swinging movement of said hooks, a pair of pulleys rotatably mounted on the upper portion of said body through means including a pair of separate, axially aligned shafts rotatably supported on said body and fixed, respectively, to said pulleys, said shafts having axial passages therethrough, an elongated element disposed in said axial passages with one end of said element non-rotatably and axially slidably secured to the surrounding one of said shafts, the other end of said elongated element threadedly engaging the other of said shafts, whereby rotation of said pulleys in opposite directions causes axial movement of said elongated element and the rotation of said pulleys in the same direction and at the same speed has no effect on the axial position of said elongated element, a pair of cables disposed about said pair of pulleys on said body and extending upwardly therefrom and about said plurality of pulleys on said carriage to thereby support said body, means controlling the movement of said cables to selectively cause said pair of pulleys on said grappler body to rotate in opposite directions and effect axial movement of said elongated element, and means interconnecting said elongated element with said cam means so that axial movement of said elongated element results in relative swinging movement of said hooks.

3. In combination with a nuclear reactor having a vertically extending pressure vessel, fuel handling apparatus comprising a housing disposed above said vessel and including an opening at its lower end in communication with an opening in the top of said vessel, an elongated grappler structure mounted within said housing by means providing for rotation relative thereto and said grappler structure including telescoping sections arranged for extension into said vessel, said grappler structure including at its lower end a grappler supporting arm hingedly mounted thereon for movement between a generally horizontal, radially extending position within said vessel and a generally vertical position folded upwardly against the supporting portion of said grappler structure, a grappler device movably supported on said arm for relative movement along the length of the arm, said grappler device comprising a carriage portion supported on said arm, a depending housing supported from said carriage by means providing for relative axial rotation of said depending housing, grappling means within said depending housing operable to releasably engage fuel elements underlying said housing, and means for controlling the axial rotation of said depending housing relative to said carriage and said supporting arm.

4. In combination with a nuclear reactor having a vertically extending pressure vessel, fuel handling apparatus comprising a housing disposed above said vessel and including an opening at its lower end in communication with an opening in the top of said vessel, an elongated grappler structure comprising telescoping frame sections mounted within said housing by means providing for rotation relative thereto and said frame sections being arranged to be extended into said vessel, a grappler supporting arm hingedly mounted on the lowermost of said telescoping sections for movement between a generally horizontal, radially extending position within said vessel and a generally vertical position folded upwardly against said lowermost section, a grappler device movably supported on said arm for relative movement therealong, said grappler device comprising a carriage portion movably supported on said arm, a depending housing supported from said carriage by means providing for relative axial rotation of said depending housing, grappling means within said depending housing operable to releasably engage fuel elements underlying said housing, and means carried by said grappler structure and operable to control the movement of said supporting arm, carriage and depending housing.

References Cited by the Examiner
UNITED STATES PATENTS

| 2,369,816 | 2/45 | Crawford | 212—56 |
| 2,764,301 | 9/56 | Goertz et al. | 214—1 |
| 3,039,949 | 6/62 | Newton et al. | 214—27 |

FOREIGN PATENTS

| 565,152 | 3/58 | Belgium. |
| 1,038,665 | 9/58 | Germany. |

OTHER REFERENCES

Second United Nations International Conference on the Peaceful Uses of Atomic Energy, UN Publication (September 1955), vol. 8, p. 225, vol. 7, pp. 582–590.

CARL D. QUARFORTH, *Primary Examiner.*

REUBEN EPSTEIN, *Examiner.*